US006540944B2

(12) United States Patent
Duggal et al.

(10) Patent No.: US 6,540,944 B2
(45) Date of Patent: Apr. 1, 2003

(54) CURRENT LIMITING DEVICE WITH CONDUCTIVE COMPOSITE MATERIAL AND METHOD OF MANUFACTURING THE CONDUCTIVE COMPOSITE MATERIAL AND THE CURRENT LIMITING DEVICE

(75) Inventors: Anil Raj Duggal, Niskayuna, NY (US); Andrew Jay Salem, Albany, NY (US); Lionel Monty Levinson, Niskayuna, NY (US); Michael Leslie Todt, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 10/057,538

(22) Filed: Jan. 24, 2002

(65) Prior Publication Data

US 2002/0067242 A1 Jun. 6, 2002

Related U.S. Application Data

(62) Division of application No. 08/977,672, filed on Nov. 24, 1997, now Pat. No. 6,373,372.

(51) Int. Cl.[7] .......................... B29C 33/40; H01B 1/02; C08C 19/00; C08F 283/00; H01C 7/10

(52) U.S. Cl. .................. 252/503; 252/62.3 E; 252/511; 252/513; 252/500; 264/35; 264/219; 264/327; 264/328.14; 338/20; 338/21; 338/13; 361/127; 525/186; 525/370; 525/462; 528/86; 528/370

(58) Field of Search ............................ 252/62.3 E, 503, 252/511, 513; 528/86, 370; 525/186, 370, 462; 361/127; 338/20, 21, 13; 264/35, 219, 327, 328.14

(56) References Cited

U.S. PATENT DOCUMENTS

| | | | |
|---|---|---|---|
| 3,226,600 | A | 12/1965 | Zielasek |
| 3,243,753 | A | 3/1966 | Kohler |
| 3,648,002 | A | 3/1972 | DuRocher |
| 3,673,121 | A | 6/1972 | Meyer |
| 4,017,715 | A | 4/1977 | Whitney et al. |
| 4,101,862 | A | 7/1978 | Takagi et al. |
| 4,107,640 | A | 8/1978 | Asano et al. |
| 4,237,441 | A | 12/1980 | Van Konynenburg et al. |
| 4,292,261 | A | 9/1981 | Kotani et al. |

(List continued on next page.)

FOREIGN PATENT DOCUMENTS

| | | |
|---|---|---|
| DE | 4330607 | 3/1995 |
| EP | 0640995 | 3/1995 |
| EP | 0713227 | 5/1996 |
| EP | 0747910 | 12/1996 |
| WO | 9112643 | 8/1991 |
| WO | 9119297 | 12/1991 |
| WO | 9321677 | 10/1993 |
| WO | 9410734 | 5/1994 |
| WO | 9534931 | 12/1995 |
| WO | 9749102 | 12/1997 |

*Primary Examiner*—Mark Kopec
*Assistant Examiner*—Kallambella Vijayakumar
(74) *Attorney, Agent, or Firm*—Toan P. Vo; Noreen C. Johnson

(57) ABSTRACT

A current limiting device comprises at least two electrodes; an electrically conducting composite material between the electrodes; interfaces between the electrodes and electrically conducting composite material; an inhomogeneous distribution of resistance at the interfaces whereby, during a high current event, adiabatic resistive heating at the interfaces causes rapid thermal expansion and vaporization and at least a partial physical separation at the interfaces; and a structure for exerting compressive pressure on the electrically conducting composite material, wherein the electrically conducting composite material comprises at least one polymer matrix and at least one conductive filler.

24 Claims, 7 Drawing Sheets

U.S. PATENT DOCUMENTS 4,304,987 A 12/1981 Van Konynenburg
4,317,027 A 2/1982 Middleman et al.
4,583,146 A 4/1986 Howell
4,685,025 A 8/1987 Carlomagno
4,890,186 A 12/1989 Matsubara et al.
5,057,674 A 10/1991 Smith-Johannsen
5,068,634 A 11/1991 Shrier
5,087,692 A * 2/1992 Stewart et al. .............. 524/611
5,115,024 A * 5/1992 Fontana et al. ............. 525/133
5,166,658 A 11/1992 Fang et al.
5,191,013 A * 3/1993 Cook et al. ................. 524/601
5,247,276 A 9/1993 Yamazaki
5,260,848 A 11/1993 Childers
5,264,548 A * 11/1993 Brunelle et al. ............ 528/196
5,313,184 A 5/1994 Greuter et al.
5,382,938 A 1/1995 Hansson et al.
5,414,403 A 5/1995 Greuter et al.
5,416,462 A 5/1995 Demarmels et al.
5,432,140 A 7/1995 Sumpter et al.
5,436,274 A 7/1995 Sumpter et al.
5,451,919 A 9/1995 Chu et al.
5,581,192 A 12/1996 Shea et al.
5,602,520 A 2/1997 Baiatu et al.
5,644,283 A 7/1997 Grosse-Wilde et al.

* cited by examiner

CURRENT LIMITING DEVICE WITH CONDUCTIVE COMPOSITE MATERIAL AND METHOD OF MANUFACTURING THE CONDUCTIVE COMPOSITE MATERIAL AND THE CURRENT LIMITING DEVICE

This application is a division of application Ser. No. 08/977,672, filed Nov. 24, 1997 now U.S. Pat. No. 6,373, 372 which is hereby incorporated by reference in its entirety.

BACKGROUND OF THE INVENTION

1. Field of the Invention

This invention relates to current limiting devices nor general circuit protection including electrical distribution and motor control applications. In particular, the invention relates to current limiting devices that are capable of limiting the current in a circuit when a short circuit event or high current condition occurs, a conductive composite material used therein, and a method of manufacture of a conductive composite material.

2. Description of Related Art

There are numerous devices that are capable of limiting the current in a circuit when a high current condition occurs. One known limiting device includes a filled polymer material that exhibits what is commonly referred to as a PTCR (positive-temperature coefficient of resistance) or PTC effect. U.S. Pat. No. 5,382,938, U.S. Pat. No. 5,313,184, and European Published Patent Application No. 0,640,995 A1 each describes electrical devices relying on PTC behavior. The unique attribute of the PTCR or PTC effect is that at a certain switch temperature the PTCR material undergoes a transformation from a basically conductive material to a basically resistive material. In some of these prior current limiting devices, the PTCR material (typically polyethylene loaded with carbon black) is placed between pressure contact electrodes.

U.S. Pat. No. 5,614,881, to Duggal et al., issued Mar. 25, 1997, the entire contents of which are herein incorporated by reference, discloses a current limiting device. This current limiting device relies on a composite material and an inhomogeneous distribution of resistance structure.

Current limiting devices are used in many applications to protect sensitive components in an electrical circuit from high fault currents. Applications range from low voltage and low current electrical circuits to high voltage and high current electrical distribution systems. An important requirement for many applications is a fast current limiting response time, alternatively known as switching time, to minimize the peak fault current that develops.

In operation, current limiting devices are placed in a circuit to be protected. Under normal circuit conditions, the current limiting device is in a highly conducting state. When a high current condition, such as a short circuit, occurs, the PTCR material heats up through resistive heating until the temperature is above the "switch temperature." At this point, the PTCR material resistance changes to a high resistance state and the high current condition current is limited. When the high current condition is cleared, the current limiting device cools down over a time period, which may be a long time period, to below the switch temperature and returns to the highly conducting state. In the highly conducting state, the current limiting device is again capable of switching to the high resistance state in response to future high current condition events.

Known current limiting devices comprise electrodes and an electrically conductive composite material, which comprises a low pyrolysis or vaporization temperature polymeric binder matrix and an electrically conductive filler, combined with an inhomogeneous distribution of resistance structure. The switching action of these current limiting devices occurs when mule heating of the electrically conductive filler in the relatively higher resistance part of the composite material causes sufficient heating to cause pyrolysis or vaporization of the binder matrix, where at least one of material ablation and arcing occur at localized switching regions in the inhomogeneous distribution of resistance structure.

In order to attain specific and desired current limiting device properties in a reusable current limiting device, it has been proposed to control at least the concentration, morphology, and state of aggregation of the conductive filler material within the polymer matrix. This control may be accomplished using thermosetting polymers, where the conductive filler material is mixed with monomers, which that can be subsequently polymerized.

However, thermosetting polymers are often brittle. Thus, thermosetting monomers will not withstand a switching event or high current event without catastrophically fracturing, which of course is undesirable. Additionally, thermosetting polymers undergo substantial shrinkage during cure that can alter the microstructure of the material. Accordingly, for some applications it is not desirable to use a thermosetting polymer to control at least the concentration, morphology, and state of aggregation of the conductive filler material within the polymer matrix in a current limiting device.

SUMMARY OF THE INVENTION

Accordingly, it is desirable to provide a quick, reusable current limiting device, where the current limiting device overcomes the above noted, and other, disadvantages of the related art.

Further, it is desirable to provide an electrically conductive composite material and a method of manufacture of the electrically conductive composite material, for use in a quick, reusable current limiting device, where the current limiting device overcomes the above noted, and other, disadvantages of the related art.

Accordingly, it is desirable to provide a current limiting device comprising at least two electrodes; an electrically conducting composite material between the electrodes; interfaces between the electrodes and electrically conducting composite material; an inhomogeneous distribution of resistance at the interfaces so that during a high current event, adiabatic resistive heating at the interfaces causes rapid thermal expansion and vaporization and at least a partial physical separation at the interfaces; and means for exerting compressive pressure on the electrically conducting composite material. The electrically conducting composite material comprises at least one polymer matrix and at least one conductive filler. The at least one polymer matrix comprises at least one thermoplastic polymerized from cyclic oligomer.

Further, it is desirable to provide a method for forming a current limiting device with an electrically conducting composite material comprising at least one polymer matrix and at least one conductive filler, where the at least one polymer matrix comprises at least one thermoplastic polymerized from cyclic oligomer.

It is also desirable to provide a method for forming an electrically conducting composite material comprising at least one polymer matrix and at least one conductive filler, where the electrically conducting composite material is useable in a current limiting device and where the at least one polymer matrix comprises at least one thermoplastic polymerized from cyclic oligomers.

These and other advantages and salient features of the invention will become apparent from the following detailed description, which, when taken in conjunction with the annexed drawings, disclose preferred embodiments of the invention.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE EMBODIMENTS

A current limiting device, as embodied by the invention, comprises an electrically conductive composite material positioned between electrodes, so that there is an inhomogeneous distribution of resistance throughout the current limiting device. The electrically conductive composite material comprises at least a conductive filler and at least one organic, preferably polymeric, binder matrix. The current limiting device, as embodied by the invention, further comprises means for exerting compressive pressure on the electrically conductive composite material of the current limiting device.

Figure 1:
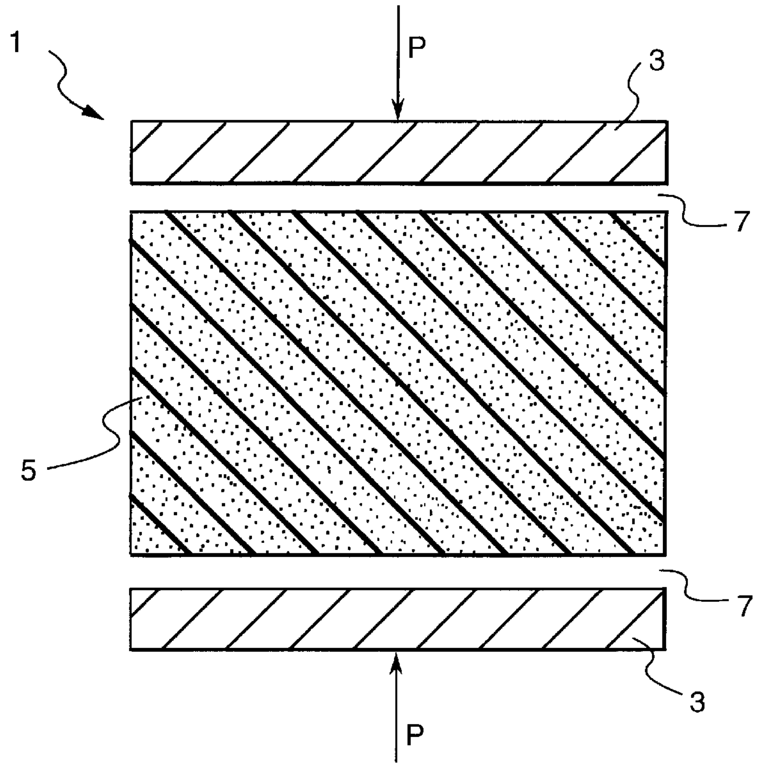
FIG. 1 is a schematic representation of a current limiting device, as embodied by the invention.

The current limiting device, as illustrated in FIG. 1, is embodied as a high current multiple use fast-acting current limiting device 1. In FIG. 1, the current limiting device 1, as embodied by the invention, comprises electrodes 3 and an electrically conductive composite material 5 with inhomogeneous distributions 7 of resistance structure under compressive pressure P. The electrically conductive composite material 5, as embodied by the invention, comprises at least a conductive filler and at least one organic, preferably polymeric, binder matrix.

Figure 2:
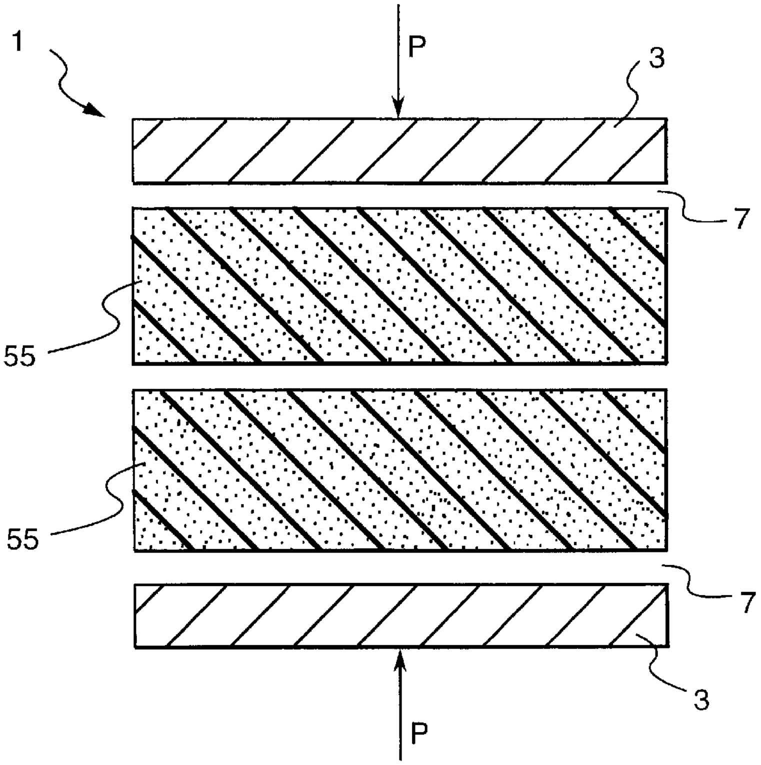
FIG. 2 is a schematic representation of a further current limiting device, as embodied by the invention.

The scope of the invention includes a high current multiple use current limiting device with any suitable construction where a higher resistance is anywhere between the electrodes 3. For example, the higher resistance may be between two composite materials 55 in the high current multiple use current limiting device, as illustrated in FIG. 2. However, this is merely exemplary and is not meant to limit the invention in any way.

To be a reusable current limiting device, the inhomogeneous resistance distribution is arranged so at least one thin layer of the current limiting device is positioned perpendicular to the direction of current flow, and has a higher resistance than the average resistance for an average layer of the same size and orientation in the device. In addition, the current limiting device is under compressive pressure in a direction perpendicular to the selected thin high resistance layer. The compressive pressure may be inherent in the current limiting device or exerted by a resilient structure, assembly or device, such as but not limited to a spring.

In operation, the current limiting device, as embodied by the invention, is placed in the electrical circuit to be protected. During normal operation, the resistance of the current limiting device is low, i.e., in this example the resistance of the current limiting device would be equal to the resistance of the electrically conductive composite material plus the resistance of the electrodes plus the contact resistance. When a high current event or short circuit occurs, a high current density starts to flow through the current limiting device. In initial stages of the short circuit or high current event, the resistive heating of the current limiting device is believed to be adiabatic. Thus, it is believed that the selected thin, more resistive layer of the current limiting device heats up much faster than the remainder of the current limiting device. With a properly designed thin layer, it is believed that the thin layer heats up so quickly that thermal expansion of and/or gas evolution from the thin layer causes a separation within the current limiting device at the thin layer.

The binder matrix should be chosen such that significant gas evolution occurs at a low (about approximately <800° C.) temperature. The inhomogeneous distribution structure is typically chosen so that at least one selected thin layer of the current limiting device has much higher resistance than the rest of the current limiting device.

The inhomogeneous distribution of resistance in the electrically conductive composite material is arranged so that at least one thin layer positioned perpendicular to the direction of current flow has a predetermined resistance, which is at least about ten percent (10%) greater than an average resistance for an average layer of the same size and orientation. Further, inhomogeneous distribution of resistance is positioned proximate to at least one electrode electrically conductive composite material interface.

It is believed that the advantageous results of the invention are obtained because, during a high current event, adiabatic resistive heating of the thin layer followed by rapid thermal expansion and gas evolution from the binding occur.

This rapid thermal expansion and gas evolution lead to a partial or complete physical separation of the current limiting device at the selected thin layer, and produce a higher over-all device resistance to electric current flow. Therefore, the current limiting device limits the flow of current through the current path.

When the high current event is cleared externally, it is believed that the current limiting device regains its low resistance state due to the compressive pressure built into the current limiting device allowing thereby electrical current to flow normally. The current limiting device, as embodied by the invention, is reusable for many such high current event conditions, depending upon such factors, among others, as the severity and duration of each high current event.

As discussed above and embodied in the invention, a current limiting device comprises a conductive composite material 5. The conductive composite material 5 comprises at least one polymer matrix and at least one conductive filler. The at least one polymer matrix of the conductive composite material comprises at least one polymer made from cyclic thermoplastic oligomers. Further, as embodied by the invention, the at least one polymer matrix comprises at least one organic polymer binder matrix.

Conductive composite materials, as embodied by the invention, comprise at least one thermoplastic matrix and at least one conductive filler, and are formed by blending, such as dry-blending, at least one cyclic oligomer with an appropriate polymerization initiator and at least one conductive filler. This dry-blending step is then followed by heat and pressure application to consolidate the composite, and to polymerize the cyclic oligomer. Thus, the conductive composite part, as embodied by the invention, is formed.

In order to attain important material variables and specific current limiting device properties, it is desirable that the concentration, morphology, and state of aggregation of the conductive filler material within the polymer matrix should be controlled. This has been previously attempted by using thermosetting polymers, where the conductive filler is mixed with monomers, which can be subsequently polymerized. However, thermosetting polymers are often brittle, and may not be able to withstand a switching event or high current event without fracturing catastrophically. Therefore, it has been determined that thermosetting polymers, while providing acceptable current limiting characteristics, are often not desirable for a polymer current limiting material in a current limiting device, because of potential fracturing due to brittleness.

The above-described method enables a desired control of important material variables and specific current limiting device properties for current limiting behavior, such as but not limited Lo the concentration, morphology, and state of aggregation of the at least one conductive filler, than was possible with known thermoplastic processing methods. Accordingly, as embodied by the invention, conductive composite materials that comprise at least one thermoplastic matrix and at least one conductive filler, where the at least one polymer matrix comprises at least one thermoplastic polymerized from cyclic oligomer, provide enhanced performance and reliability.

Thermoplastic polymers, in a current limiting device as embodied by the invention, offer a damage tolerant alternative due to their inherent toughness, compared to most thermosetting materials. Additionally, thermoplastics can soften and flow at elevated temperatures, while thermosets can no longer flow at any temperature after polymerization. This ability to flow can be advantageous in regaining a low current limiting device resistance state after destructive material ablation, which occurs during a switching event or high current event. It is believed that this flow, otherwise known as plastic deformation, occurs at a contact interface due to joule heating after the switching event or high current event combined with the central contact pressure of the electrodes. The flow provides an increase in effective contact area. Thus, a current limiting device comprising a conductive composite material as embodied in the invention, with a polymerized cyclic oligomer, provides a desirable decrease in contact resistance.

The use of some known thermoplastics for a polymer matrix material in a polymer current limiting device has been determined to be difficult due, at least in part, to limitations in traditional methods of mixing fillers into thermoplastics. For example, known thermoplastics are processed as a viscous, high polymer melt. This processing requires elevated temperatures, and uses extrusion or some other high shear mixing method. However, even at elevated temperatures, it is difficult to achieve a thermoplastic polymer matrix material with a homogeneous dispersion of filler when a high concentration of filler is required.

The difficulty to achieve a polymer matrix material with a thermoplastic homogeneous dispersion, when a high concentration of filler is required, is due at least in part to the relatively high viscosity of the thermoplastic matrix. Additionally, high shear rates required by extrusion or other high shear mixing methods often changes morphology of, for example by ripping apart, the natural state of aggregation of the conductive filler material particles. Accordingly, it has been determined that it is desirable to provide a method for making thermoplastic-matrix polymer current limiting device materials, as embodied by the invention, where the conductive filler material can be easily dispersed into the polymer matrix at high concentrations, without high shear rate mixing.

Figure 3:
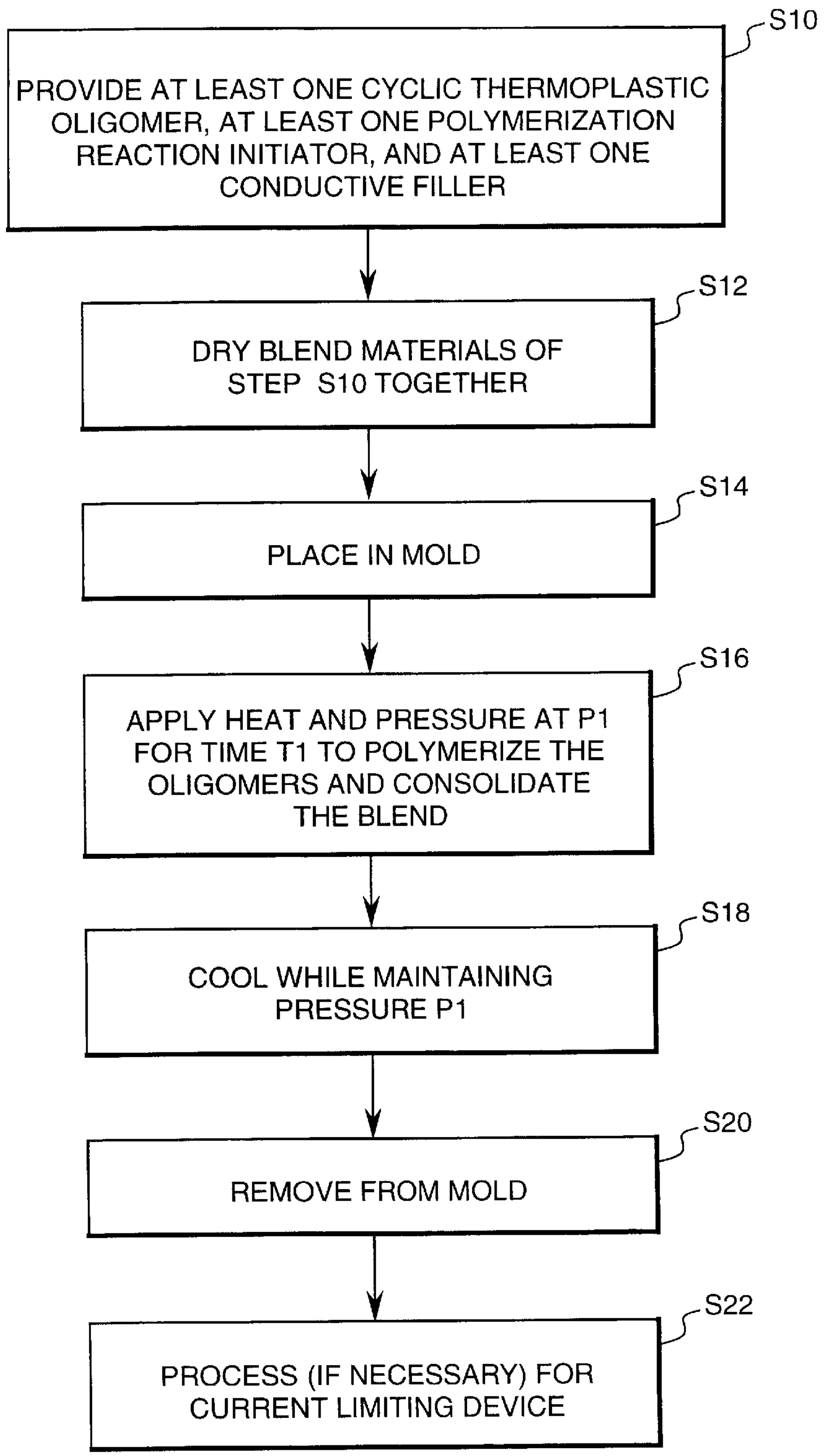
FIG. 3 is a flow chart of one process for manufacturing a conductive composite material for use in a current limiting device.

A method for preparing conductive composite materials, as embodied in the invention, will now be described, with reference to the flow chart of FIG. 3. In step S10, at least one cyclic thermoplastic oligomer, at least one polymerization reaction initiator, and at least one conductive filler are provided for the conductive composite material, as embodied by the invention. The at least one cyclic thermoplastic oligomer, at least one polymerization reaction initiator, and at least one conductive filler are blended, such as dry-blended, together in step S12. This dry-blending step S12 is then followed step S14 in which the dry-blended materials are placed in a mold.

Next, in step S16, heat and pressure are applied to the mold and the dry-blended material, for a time T1 and at a pressure P1. The application of applying heat and pressure in step S16, and polymerizes the at least one cyclic thermoplastic oligomer and the at least one polymerization initiator, and also consolidates the conductive composite. Thus, the conductive composite part is formed.

Following the polymerization in step S16, the polymerized conductive composite material is cooled, in step S18, while the pressure P1 is maintained. The cooled polymerized conductive composite material is removed from the mold in step S20. If further cutting, machining or processing is needed to prepare the polymerized conductive composite material for use in a current limiting device, step S22 is provided, so the polymerized conductive composite material is compatible with a current limiting device.

The above described method enables a desired control of material variables and specific current limiting device properties for current limiting behavior, such as but not limited to, the concentration, morphology, and state of aggregation of the at least one conductive filler, than was possible with known thermoplastic processing methods.

For example, polymer current limiting materials have been proposed with a thermoplastic matrix with polyethylene as a polymer matrix material and nickel as a conductive filler material. This polymer current limiting material is prepared using well-known thermoplastic mixing techniques. The polyethylene comprises a high melt-flow material to minimize shear forces on the conductive filler material. The conductive filler nickel is dispersed into the polyethylene by adding a conductive filler, such as nickel, to molten polyethylene at about 160° C. in a mixer. After a given mixing time, the conductive composite material was cooled to room temperature, ground into fine particles, and then compression molded at elevated temperature about 160° C. under pressure. The current limiting performance of the above described conductive composite material exhibited satisfactory performance. However, performance varied with changes in at least one of mixing time, temperature, and brabender shear rate. The variations are presumably due at least on part to the effect of these variables on the morphology and dispersion of the conductive filler that may occur during processing. Accordingly, while the performance of these conductive composite materials is generally acceptable, the varied performance is not satisfactory.

Therefore, it has been determined that use of cyclic oligomers in a polymerized conductive composite material avoids varied performance of a polymerized conductive composite material, and provides enhanced performance and reliability. Therefore, as embodied by the invention, polymerized conductive composite materials for current limiting devices are formed from cyclic oligomers, which are ring-like molecules.

Cyclic oligomers comprise a small number of repeat units. Cyclic oligomers are generally, and normally, solid at room temperature, and are essentially non-reactive. At elevated temperatures, the rings of the cyclic oligomers melt into a low viscosity liquid. With an addition of an appropriate initiator, the rings of the cyclic oligomers open and concatenate into large, linear polymer molecules. As embodied by the invention, cyclic oligomers include but are not limited to, cyclic polycarbonates, such as set forth in U.S. Pat. No. 4,727,134 the contents of which are incorporated by reference; cyclic polyesters, such as set forth in U.S. Pat. No. 5,039,783 the contents of which are incorporated by reference; and cyclic polyamides, such as set forth in U.S. Pat. No. 5,362,845 the contents of which are incorporated by reference.

The polymerization of the cyclic oligomers occurs without solvent and does not generate by-products. Thus, the polymerization can occur in a closed mold without volatile solvents or the creation of reaction by-products, both of which are undesirable. The rate of the reaction for the polymerization is controlled by at least one of a choice of initiator, concentration of initiator, and temperature.

Unlike most thermoset materials, a polymerization reaction of cyclic oligomers is essentially thermoneutral. Therefore, managing an internal polymer temperature rise using polymerization, which is an important factor in making thick parts, is essentially eliminated using at least one cyclic thermoplastic oligomer, as embodied by the invention.

Further, as embodied by the invention, cyclic oligomer thermoplastics comprise bisphenol-A carbonate and cyclic butyleneterephthalate ester oligomers (PBT). Cyclic butyleneterephthalate ester oligomers (PBT) yield a semi-crystalline polyester, giving an improved solvent resistance and an ability to be isothermally processed.

Methods for the formation of polymerized conductive composite material will now be discussed. The following are merely examples of possible methods of formation of polymerized conductive composite materials, as embodied by the invention. Other methods are within the scope of the invention.

As embodied by the invention, one method for the preparation of a polymerized conductive composite material comprises dry-blending at least one conductive filler with at least cyclic thermoplastic oligomer, for example a cyclic thermoplastic oligomer resin and at least one polymerization initiator. However, this is merely exemplary of the invention, and is not meant to limit the invention, in any way. This dry-blending provides for a uniform dispersion of the at least one conductive filler, for example nickel, in the cyclic oligomer and initiator mixture. The mixture is then placed in a mold, such as a heated tool cavity, between platens of a compression press. Polymerization of the cyclic oligomers then occurs.

Before or during the polymerization of the cyclic oligomers, pressure is applied to consolidate the polymerized conductive composite material. Since there is basically no flow of the material while under pressure, the uniform dispersion of the conductive filler in the cyclic oligomer is maintained throughout these steps. The tool cavity and associated tool are then cooled, while maintaining the pressure. After the molded polymerized conductive composite material part is cooled, the molded polymerized conductive composite material part is removed from the tool cavity.

The resultant molded polymerized conductive composite material part, for use in a current limiting device as embodied by the invention, provides desirable current limiting properties. The desirable current limiting properties are due, at least in part, to a uniform dispersion of the conductive filler in a polymerized conductive composite material, as described above. The uniform dispersion is attained through, at least in part to a low melt viscosity of the cyclic thermoplastic oligomers prior to polymerization.

Examples of processes for forming a conductive composite material for use in a current limiting device, as embodied by the invention, will now be discussed. These are merely exemplary and are not meant to limit the invention in any way. The scope of the invention comprises other materials and steps, that are within the skill of one of ordinary skill in the art.

In a first example of a fabrication method for a conductive composite material as a polymer current limiting material, as embodied by the invention, a conductive composite material comprises about 50% by weight nickel in PBT. The fabrication method comprises blending PBT cyclic oligomers in a solution with polymerization reaction initiator.

Figure 4:
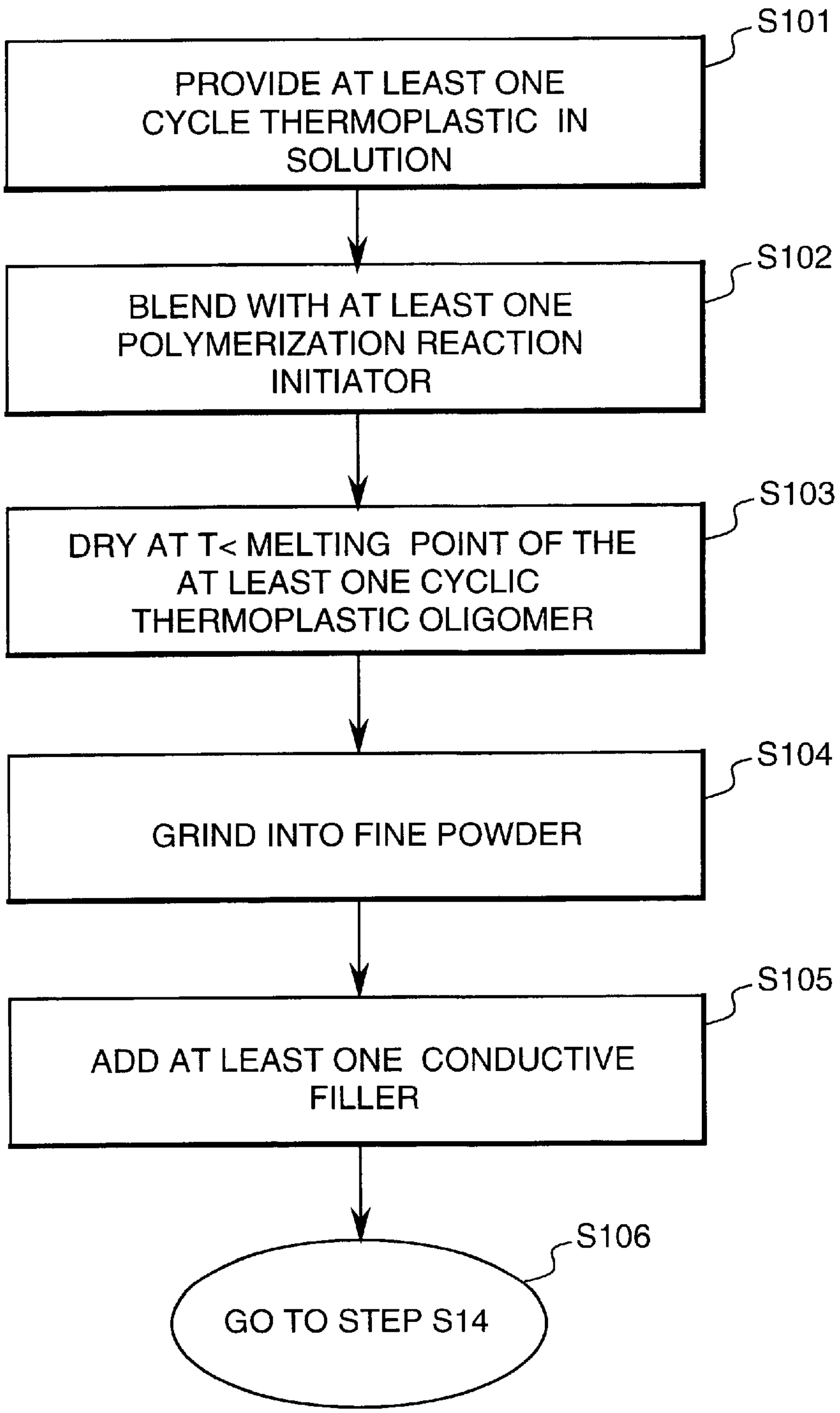
FIG. 4 is a flow chart of a further process for manufacturing a conductive composite material for use in a current limiting device.

FIG. 4 illustrates a process for the preparation of the PBT cyclic oligomers. In FIG. 4, at least one cyclic thermoplastic oligomer, such as for example a PBT cyclic oligomer, is provided in solution in step S101. The PBT cyclic oligomer is then blended at step S102 with at least one polymerization reaction initiator, such as, but not limited to, 1,1,6,6-tetrabutyl-1,6-distanna-2,5,7,10-tetraoxacyclodecane, otherwise known as a stannoxane initiator. The blend is dried in step S103 at a temperature below the melting point of the cyclic thermoplastic oligomers to prevent any polymerization.

Next in step S104, the mixture is subsequently ground to a fine powder. The process then adds the at least one conductive filler step S106 and returns to step S14 in FIG. 3. The powder mixture is any blended with an approximately equal weight of a conductive filler, such as for example, nickel powder, which is provided about a 50% by weight nickel blend.

The blended material is dried for an appropriate time at an elevated temperature, for example about 100° C. under vacuum. The blended material is then molded into an appropriate shape for use in current limiting device, if needed. Alternatively, the molded polymerized conductive composite material part can be cut or otherwise formed into a desired shape for use in a current limiting device.

To mold the polymerized conductive composite material part, an appropriate amount of the blended material is placed into a compression molding tool. The tool with the blended material is then heated to an appropriate temperature for polymerization, for example about 450° F. When the tool temperature reached about 375° F., a timed period T1 was started and after the completion of the period and the attainment of a temperature of about 450° F., which ensures complete polymerization of the cyclic oligomers, a pressure P1 was applied to consolidate the polymerized PBT/Ni composite material.

The tool and polymerized PBT/Ni composite material are then cooled to room temperature, while the pressure P1 is maintained. The PBT/Ni composite polymerized conductive material part, with a desired shape, is then removed from the mold. PBT/Ni composite polymerized conductive material part can then be tested for current limiting performance characteristics.

The PBT/Ni composite material, as prepared above, satisfactorily operates as a current limiting device, based on tests performed thereon. In the tests, electrodes were centered on both sides of the PBT/Ni composite polymerized conductive material, as embodied by the invention, in a direction normal to the thickness dimension. Pressure was applied to the PBT/Ni composite polymerized conductive material by placing a force across the electrodes. The current limiting device acts as a simple resistor with a resistance of about 0.18 ohm when a low current of about 1 A was put through the device.

Figure 5:
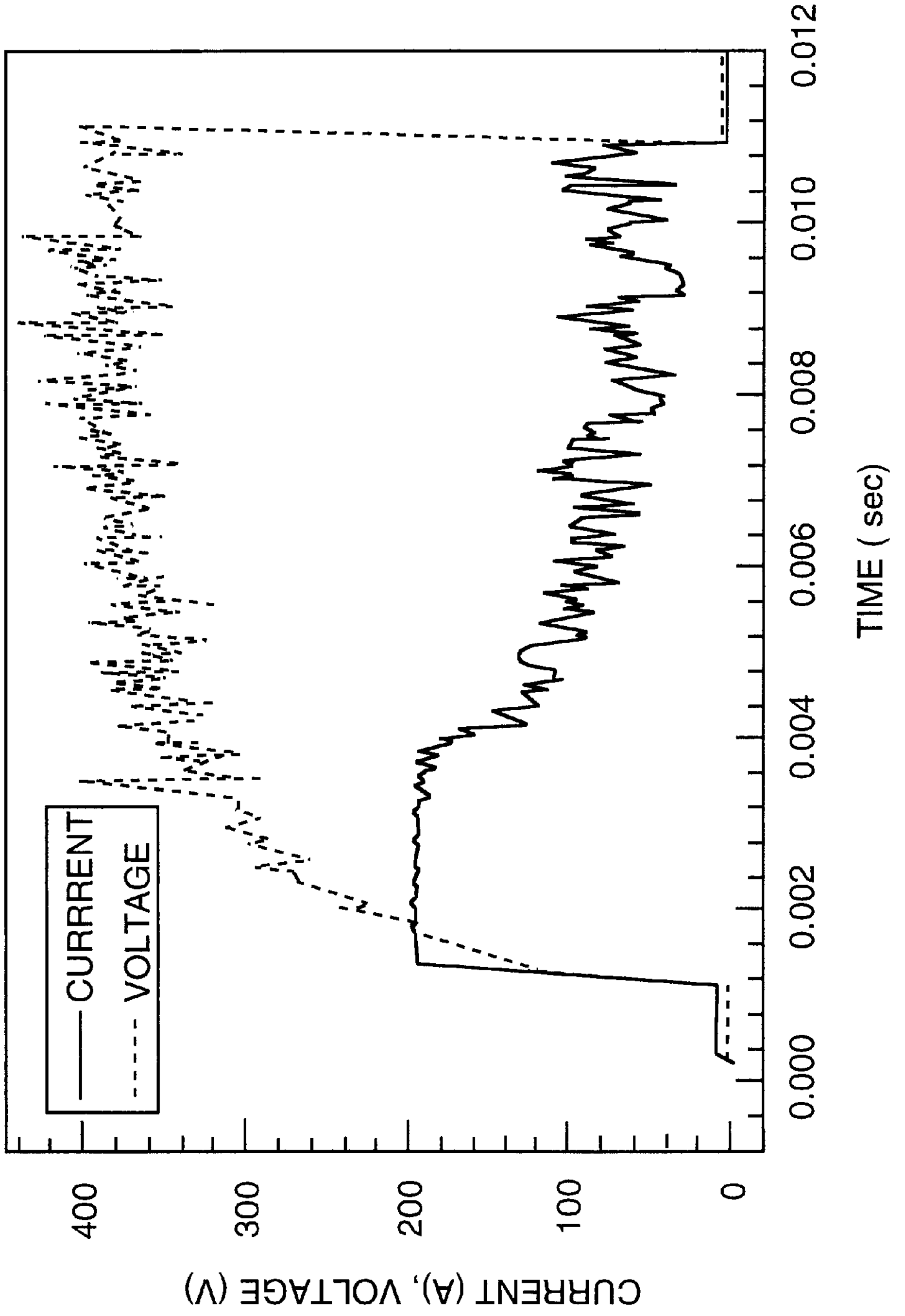
FIG. 5 is a graph of current versus voltage for a current limiting device with a conductive composite material, as embodied by the invention.

FIG. 5 illustrates current and voltage waveforms across the current limiting device for the PBT/Ni composite material, when an amplifier was set to deliver a first pulse of about 10 A for about 1 msec, and then about 200 A for about 10 msec. During the first about one millisecond when about 10 A of current was applied, the current limiting device retained its initial resistance. With the onset of about 200 A, the current limiting device resistance rapidly increased. This increase is illustrated by the voltage across the current limiting device rapidly increasing above about the 36 V expected, if the current limiting device retained its initial resistance, i.e., 36 V=200 A*0.18 ohm.

As illustrated in FIG. 5, the voltage continues to rise as the resistance of the current limiting device increases. At around about 3.5 msec, the current drops below about 200 A as the resistance increases where the amplifier no longer has the power to sustain about 200 A. At the end of the pulse, the current limiting device resistance is about 6 ohm indicating about a 30 times resistance increase. After the completion of this pulse test, the current limiting device resistance returned to a low resistance state. The current limiting device was ready for reuse and further operations. A second high current pulse, similar to the first pulse described above, was applied to the current limiting device, and showed similar current limiting properties.

In a second example of a fabrication method for a conductive composite material, as embodied by the invention, a polymer current limiting material comprises about 55% by weight nickel in poly(bisphenol-A carbonate). In the second example, as embodied by the invention, cyclic oligomers were solution blended with an initiator, for example a lithium salicylate initiator. Similar steps, i.e., step S101 through step S106 and steps S10 through step S22, were performed on the second example of a thermoplastic fabrication method for a conductive composite material, as embodied by the invention.

The second composite polymerized conductive material formed by the second example of a thermoplastic fabrication method for a polymer current limiting material in a current limiting device, as bodied by the invention, also exhibits satisfactory current limiting properties. The current limiting device of the second example, also exhibits desirable operation in a reuse operation.

Figure 6:
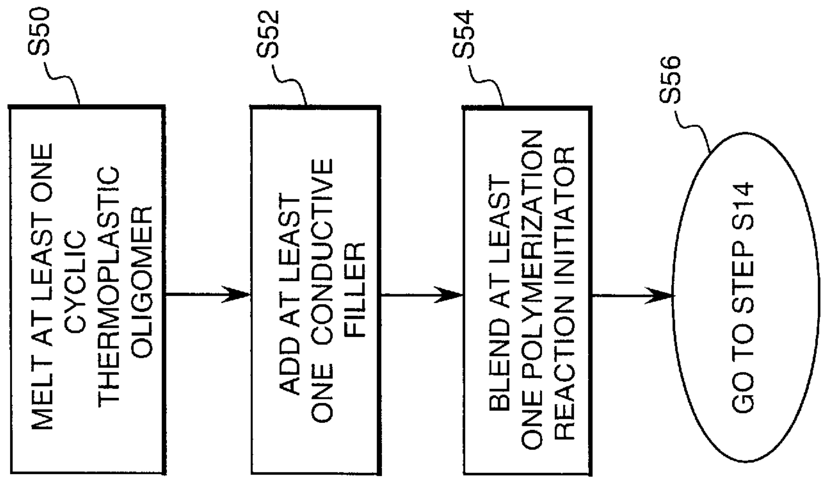
FIG. 6 is a flow chart of another process for manufacturing a conductive composite material for use in a current limiting device

Alternatively, another fabrication method within the scope of the invention, is illustrated in FIG. 6. This method comprises initially melting, at least one thermoplastic cyclic oligomer, in step S50 to a low viscosity melt. Next, at least one conductive filler, such as nickel powder, is added to the melt in step S52, while mixing the low viscosity melt. At least one initiator, which in this process comprises at least one of a dry, liquid or solvent with a viscous or powder initiator, is blended into the melt in step S54. The process then in step S56 returns to step S14 for continued processing of the conductive composite material, as embodied by the invention.

Figure 7:
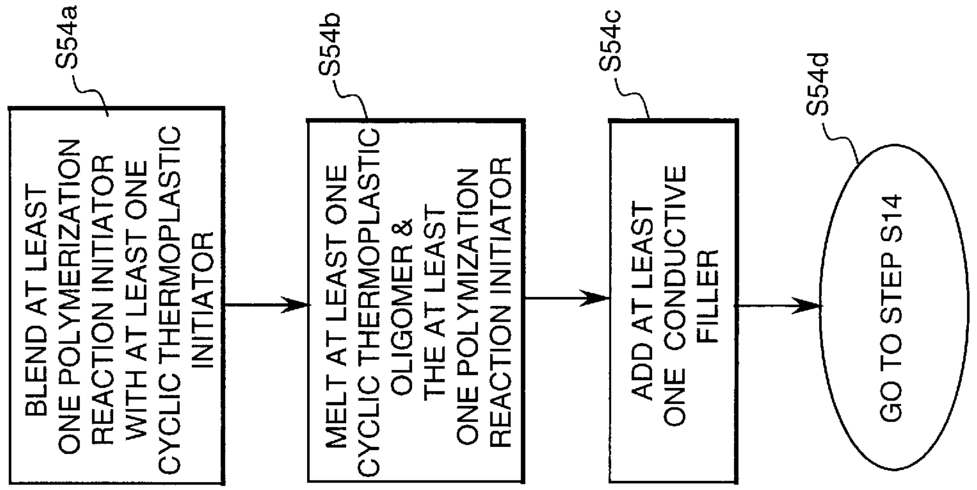
FIG. 7 is a flow chart of a still further process for manufacturing a conductive composite material for use in a current limiting device.
Figure 8:
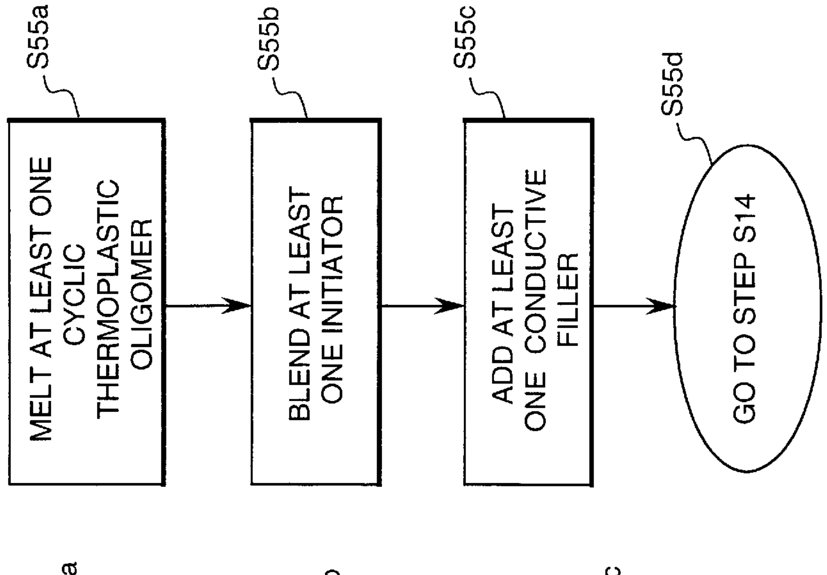
FIG. 8 is a flow chart of yet another process for manufacturing a conductive composite material for use in a current limiting device.
Figure 9:
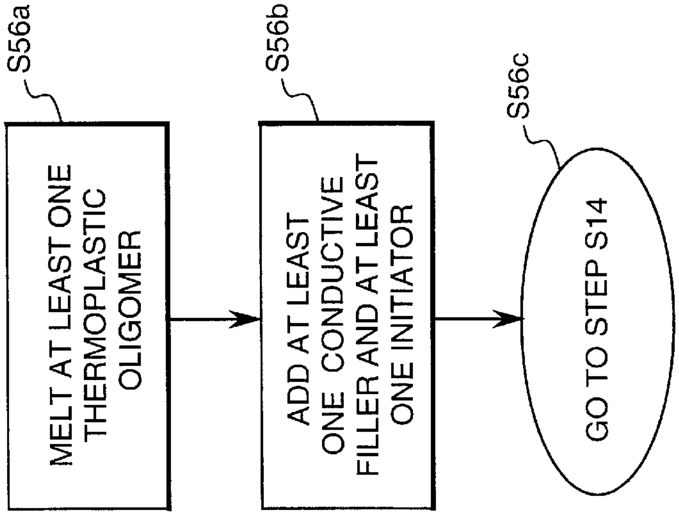
FIG. 9 is a flow chart of still a further process for manufacturing a conductive composite material for use in a current limiting device.

The at least one polymerization reaction initiator in the above-described method can be blended into the cyclic oligomer by a variety of processes, within the scope of the invention. FIGS. 7–9 illustrate some of the differing processes within the scope of the invention, for adding the at least one initiator. The location of step S54 varies in these processes, and other steps remain unchanged, except where discussed below.

In the process of FIG. 7, at least one polymerization reaction initiator is added to at least one cyclic thermoplastic oligomer in step **S54*a*. This addition is done prior to melting. Next at step S54*b* the blend of the at least one cyclic thermoplastic oligomers and the at least one polymerization reaction initiator is melted. At least one conductive filler is added to the melt at step S54*c*. After that, at step S54*d*, the process returns to step S14**.

In the process of FIG. 8, the at least one cyclic thermoplastic oligomers is melted in step **S55*a*. Next, at step S55*b*, at least one polymerization reaction initiator is added to the melt, where the at least one polymerization reaction initiator is one of a solid and liquid. After that, in step S55*c*, at least one conductive filler is added to the melt. After that, at step S55*d*, the process returns to step S14**.

Further, in the fabrication process of FIG. 9, the at least one cyclic thermoplastic oligomers is melted in step **S56*a*. The at least one polymerization reaction initiator is added at the same time with the at least one conductive filler in step S56*b*, without a separate step for adding the at least one conductive filler. The process then returns to step S14 at step S56*c***.

Figure 10:
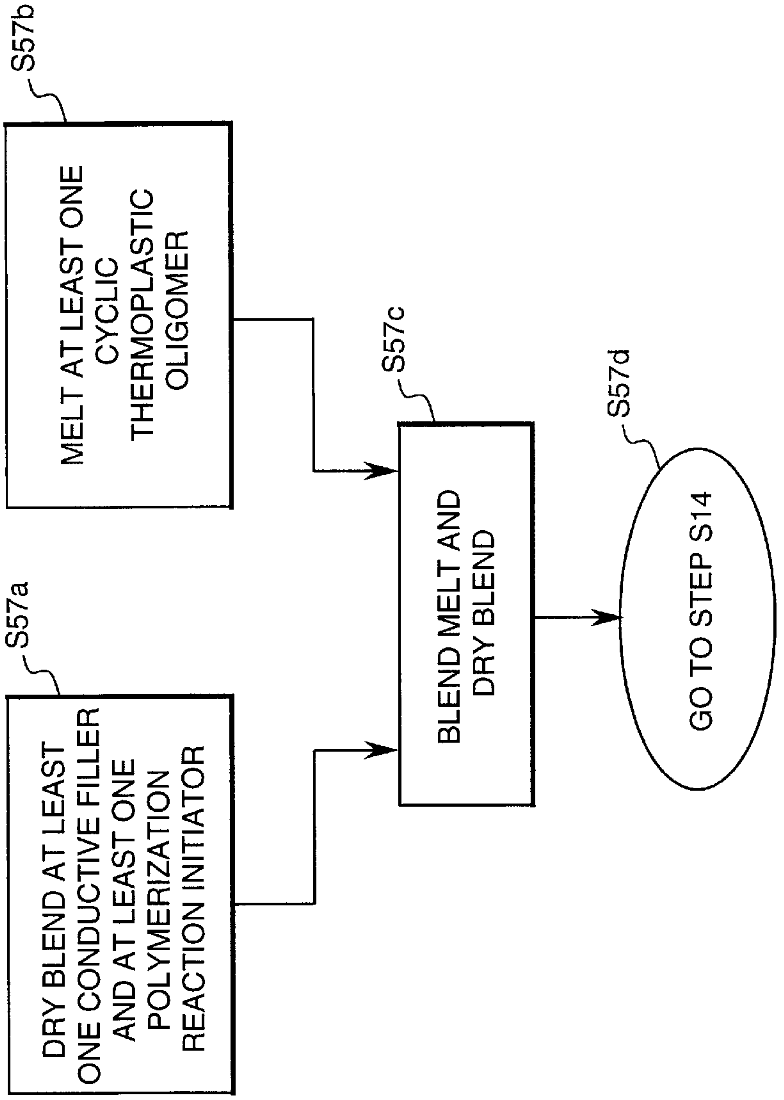
FIG. 10 is a flow chart of one further process for manufacturing a conductive composite material for use in a current limiting device.

Furthermore, as embodied by the invention, at least one conductive filler and at least one polymerization reaction initiator are dry blended together, as in step **S57*a* in FIG. 10. As separate melt of at least one cyclic thermoplastic oligomer is provided at step S57*b*. Next at step 57*c*, the melt of the at least one cyclic thermoplastic oligomer and the dry blend of the at least one conductive filler and the at least one polymerization reaction initiator are blended together. The fabrication process of FIG. 10 then returns to step S14 in FIG. 3**.

Polymerization reaction initiators providing a wide range of activity are known, and are within the scope of the invention. These initiators provide a variety of mixing times and polymerization rates, depending on the specifics of the process, the desired manufacture constraints, and other such factors.

Figure 11:
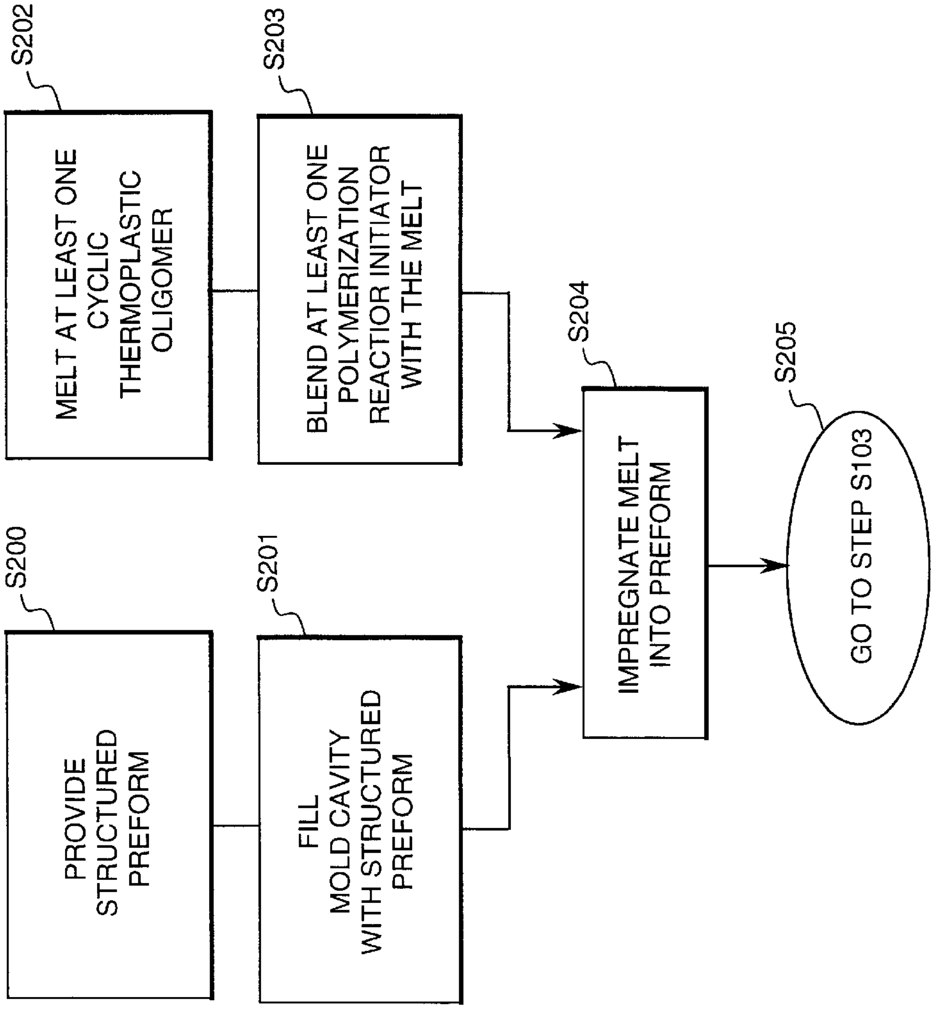
FIG. 11 is a flow chart of a further process for manufacturing a conductive composite material for use in a current limiting device.

A further fabrication process, within the scope of the invention, is illustrated in the flowchart of FIG. 11. In this fabrication process, a structured preform, for example a structured nickel preform, is initially provided in step S200. Next in step S201, a cavity of a mold is filled with the structured preform. At the same time, before or after steps S200 and S201, at least one cyclic thermoplastic oligomer is melted in step S202. The melted at least one cyclic thermoplastic oligomer is then blended with least one polymerization reaction initiator at step S203.

At step S204, the cavity with the preform is then filled, for example by infusing or pumping the melt from step S203 into the preform to impregnate the preform. Next the process at step S205 returns to step S16 as illustrated in FIG. 3.

Figure 12:
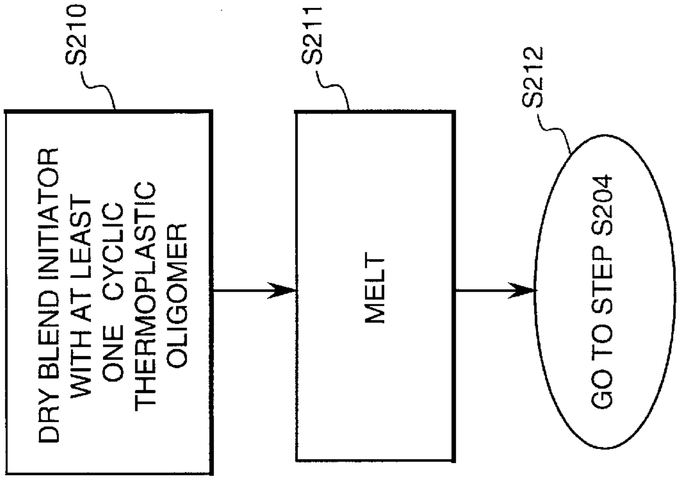
FIG. 12 is a flow chart of another process for manufacturing a conductive composite material for use in a current limiting device

Alternatively, steps S202 and S203 of the fabrication process may be replaced with steps S210, S211 and S212 as illustrated in FIG. 12. In step S210, a dry blend of at least one cyclic thermoplastic oligomer and at least one polymerization reaction initiator is provided. Next in step S211, the dry blend is melted. After the blend is melted, the fabrication process at step S212 returns to step S204 of the process of FIG. 11.

While the embodiments described herein are preferred, it will be appreciated from the specification that various combinations of elements, variations or improvements therein may be made by those skilled in the art that are within the scope of the invention.

What is claimed is:

1. A method of manufacturing a polymerized electrically conducting composite material, the polymerized electrically conducting composite material comprising at least one polymer matrix and at least one conductive filler; the at least one polymer matrix comprising at least one thermoplastic polymerized from at least one cyclic thermoplastic oligomer, the method comprising:

providing at least one cyclic thermoplastic oligomer;

providing at least one metallic conductive filler;

providing at least one polymerization reaction initiator;

dry blending the at least one cyclic thermoplastic oligomer, the at least one polymerization reaction initiator and the at least one metallic conductive filler to form a dry blend of at least one cyclic thermoplastic oligomer and at least one metallic conductive filler, wherein the conductive filler is dispersed in the dry blend;

applying heat and pressure to the blend of the at least one cyclic thermoplastic oligomer and at least one metallic conductive filler; and polymerizing the at least one cyclic thermoplastic oligomer and at least one metallic conductive filler blend to form a polymerized electrically conductive composite material.

2. A method according to claim 1, placing the blend of at least one metallic polymer matrix and the at least one conductive filler in a mold prior to the applying heat and pressure.

3. A method according to claim 1, further comprising cooling the polymerized electrically conductive composite material while maintaining the applied pressure.

4. A method according to claim 3, further comprising moving the polymerized electrically conductive composite material from the mold after the cooling.

5. A method according to claim 1, further comprising cooling the polymerized electrically conductive composite material while maintaining the applied pressure and removing the polymerized electrically conductive composite material from the mold after the cooling.

6. The method according to claim 1, further comprising sandwiching the polymerized electrically conductive composite material between two electrically conducting materials.

7. The method according to claim 1, wherein the providing at least one cyclic thermoplastic oligomer comprises:

providing the at least one cyclic thermoplastic oligomer in solution;

blending the at least one cyclic thermoplastic oligomer in solution with the at least one polymerization reaction initiator to form an at least one cyclic thermoplastic oligomer and at least one polymerization reaction initiator blend;

drying the at least one cyclic thermoplastic oligomer and at least one polymerization reaction initiator blend into a dried blend at a temperature below a melting point of each at least one cyclic thermoplastic oligomer; and grinding the dried at least one cyclic thermoplastic oligomer and at least one polymerization reaction initiator blend into a powder.

8. The method according to claim 1, wherein the providing at least one cyclic thermoplastic oligomer, the providing at least one metallic conductive filler, the providing at least one polymerization reaction initiator, and the blending the at least cyclic thermoplastic oligomer and the at least one metallic conductive filler together to form an at least one metallic cyclic thermoplastic oligomer and at least one conductive filler blend comprises:

providing a melt of at least one cyclic thermoplastic oligomer;

adding the at least one metallic conductive filler to the melt; and blending the melt of at least one cyclic thermoplastic oligomer and the at least one metallic conductive filler with the at least one polymerization reaction initiator.

9. The method according to claim 1, wherein the providing at least one cyclic thermoplastic oligomer, the providing at least one metallic conductive filler, the providing at least one polymerization reaction initiator, and the blending the at least one cyclic thermoplastic oligomer and the at least one metallic conductive filler together to form an at least one metallic cyclic thermoplastic oligomer and at least one conductive filler blend comprises:

blending the at least one polymerization reaction initiator with the at least one cyclic thermoplastic oligomer to form a blend;

melting the blend to form an at least one cyclic thermoplastic oligomer and at least one polymerization reaction initiator melt mixture; and adding the at least one metallic conductive filler to the melt mixture.

10. The method according to claim 1, wherein the providing at least one cyclic thermoplastic oligomer, the providing at least one metallic conductive filler, the providing at least one polymerization reaction initiator, and the blending the at least one polymer matrix and the at least one metallic conductive filler together to form an at least one cyclic thermoplastic oligomer and at least one metallic conductive filler blend comprises:

melting the at least one cyclic thermoplastic oligomer to form a melt;

blending the at least one polymerization reaction initiator with the melt to form a blend; and adding the at least one metallic conductive filler to the blend.

11. The method according to claim 1, wherein the at least one cyclic thermoplastic oligomer comprises at least one at least one cyclic thermoplastic oligomer selected from the group consisting of:

cyclic polycarbonates; cyclic polyesters; and cyclic polyamides.

12. The method according to claim 1, wherein the at least one cyclic thermoplastic oligomer comprises at least one of cyclic bisphenol-A carbonate and cyclic butyleneterephthalate ester.

13. The method according to claim 1, further comprising cooling the polymerized conductive composite material.

14. The method according to claim 1, wherein the polymerizing occurs essentially without formation of by-products and without a need for solvent.

15. The method according to claim 14, wherein the providing at least one polymerization reaction initiator comprises selecting at least one of a 1,1,6,6-tetra-butyl-1,6-distanna-2,5,7,10-tetraoxacyclodecane polymerization reaction initiator and a lithium salicylate polymerization reaction initiator.

16. The method according to claim 1, wherein the blending comprises dry-blending.

17. A method of manufacturing a polymerized electrically conducting composite material, the polymerized electrically conducting composite material comprising at least one polymer matrix and at least one conductive filler; the at least one polymer matrix comprising at least one thermoplastic polymerized from at least one cyclic thermoplastic oligomer, the method comprising:

providing at least one cyclic thermoplastic oligomer;

providing at least one conductive filler;

providing at least one polymerization reaction initiator;

blending the at least one cyclic thermoplastic oligomer, the at least one polymerization reaction initiator and the at least one conductive filler to form a blend of at least one cyclic thermoplastic oligomer and at least one conductive filler;

applying heat and pressure to the blend of the at least one cyclic thermoplastic oligomer and at least one conductive filler; and polymerizing the at least one cyclic thermoplastic oligomer and at least one conductive filler blend to form a polymerized electrically conductive composite material;

wherein the at least one cyclic thermoplastic oligomer comprises cyclic butyleneterephthalate ester oligomers and the at least one conductive filler comprises nickel.

18. A method of manufacturing a polymerized electrically conducting composite material, the polymerized electrically conducting composite material comprising at least one polymer matrix and at least one conductive filler; the at least one polymer matrix comprising at least one thermoplastic polymerized from at least one cyclic thermoplastic oligomer, the method comprising:

providing at least one cyclic thermoplastic oligomer;

providing at least one conductive filler;

providing at least one polymerization reaction initiator;

blending the at least one cyclic thermoplastic oligomer, the at least one polymerization reaction initiator and the at least one conductive filler to form a blend of at least one cyclic thermoplastic oligomer and at least one conductive filler;

applying heat and pressure to the blend of the at least one cyclic thermoplastic oligomer and at least one conductive filler; and polymerizing the at least one cyclic thermoplastic oligomer and at least one conductive filler blend to form a polymerized electrically conductive composite material;

wherein the at least one cyclic thermoplastic oligomer comprises cyclic polyamide ester oligomers and the at least one conductive filler comprises nickel.

19. A method of manufacturing a polymerized electrically conducting composite material, the polymerized electrically conducting composite material comprising at least one polymer matrix and at least one conductive filler; the at least one polymer matrix comprising at least one thermoplastic polymerized from at least one cyclic thermoplastic oligomer, the method comprising:

providing at least one cyclic thermoplastic oligomer;

providing at least one conductive filler;

providing at least one polymerization reaction initiator;

blending the at least one cyclic thermoplastic oligomer, the at least one polymerization reaction initiator and the at least one conductive filler to form a blend of at least one cyclic thermoplastic oligomer and at least one conductive filler;

applying heat and pressure to the blend of the at least one cyclic thermoplastic oligomer and at least one conductive filler; and polymerizing the at least one cyclic thermoplastic oligomer and at least one conductive filler blend to form a polymerized electrically conductive composite material;

wherein the step of polymerizing comprises forming a polycarbonate from the at least one cyclic thermoplastic oligomer and the at least one conductive filler comprises nickel.

20. A method of manufacturing a polymerized electrically conducting composite material, the polymerized electrically conducting composite material comprising at least one polymer matrix and at least one conductive filler; the at least one polymer matrix comprising at least one thermoplastic polymerized from at least one cyclic thermoplastic oligomer, the method comprising:

providing at least one cyclic thermoplastic oligomer;

providing at least one conductive filler;

providing at least one polymerization reaction initiator;

blending the at least one cyclic thermoplastic oligomer, the at least one polymerization reaction initiator and the at least one conductive filler to form a blend of at least one cyclic thermoplastic oligomer and at least one conductive filler;

applying heat and pressure to the blend of the at least one cyclic thermoplastic oligomer and at least one conductive filler; and polymerizing the at least one cyclic thermoplastic oligomer and at least one conductive filler blend to form a polymerized electrically conductive composite material;

wherein the at least one conductive filler comprises nickel.

21. A method of manufacturing a current limiting device, the current limiting device comprising at least two electrodes; an electrically conducting composite material structure between said electrodes; interfaces between said electrodes and electrically conducting composite material structure; an inhomogeneous distribution of resistance at said interfaces whereby, during a high current event, adiabatic resistive heating at said interfaces causes rapid thermal expansion and vaporization and at least a partial physical separation at said interfaces; and means for exerting compressive pressure on said electrically conducting composite material structure, wherein said electrically conducting composite material comprises at least one polymer matrix formed from at least one cyclic thermoplastic oligomer and at least one conductive filler; the method comprising:

manufacturing the electrically conducting composite material, formed from at least one polymer matrix and at least one conductive filler; the manufacturing the electrically conducting composite material comprising:

providing at least one cyclic thermoplastic oligomer;

providing at least one conductive filler;

providing at least one polymerization reaction initiator, blending the at least one cyclic thermoplastic oligomer, the at least one polymerization reaction initiator, and the at least one conductive filler together to form an at least one cyclic thermoplastic oligomer and at least one conductive filler blend; and applying heat and pressure to the at least one cyclic thermoplastic oligomer and at least one conductive filler blend to polymerize the at least one cyclic thermoplastic oligomer and at least one conductive filler blend and form a polymerized the electrically conducting composite material;

the manufacturing the current limiting device comprising:

providing the at least two electrodes; and providing the polymerized electrically conducting composite material between the at least two electrodes and placing the at least two electrodes and electrically conducting composite material under pressure from the exerting means.

22. A method of manufacturing a electrically conducting composite material, the electrically conducting composite material comprising at least one polymer matrix and at least one preform, where the at least one polymer matrix is impregnated in the at least one preform; the at least one polymer matrix comprising at least one thermoplastic polymerized from at least one cyclic thermoplastic oligomer, the method comprising:

providing at least one cyclic thermoplastic oligomer;

blending the at least one cyclic thermoplastic oligomer with at least one polymerization reaction initiator;

providing at least one electrically conductive metallic preform;

providing the at least one electrically conductive metallic preform in a mold;

impregnating the blend of the at least one cyclic thermoplastic with at least one polymerization reaction initiator into the at least one electrically conductive metallic preform provided in the mold;

applying heat and pressure to the blend of the at least one cyclic thermoplastic oligomer with at least one polymerization reaction initiator in the mold; and polymerizing the blend of the at least one cyclic thermoplastic oligomer with at least one polymerization reaction initiator in the mold to form a polymerized electrically conductive composite material.

23. The method of claim 22, further comprising melting the at least one cyclic thermoplastic oligomer prior to the blending.

24. The method of claim 22, wherein the blending comprises dry blending the at least one cyclic thermoplastic oligomer and the at least one polymerization reaction initiator.

* * * * *